Feb. 24, 1942. E. C. HORTON 2,274,294
WINDOW CLEANING SYSTEM
Filed April 1, 1939
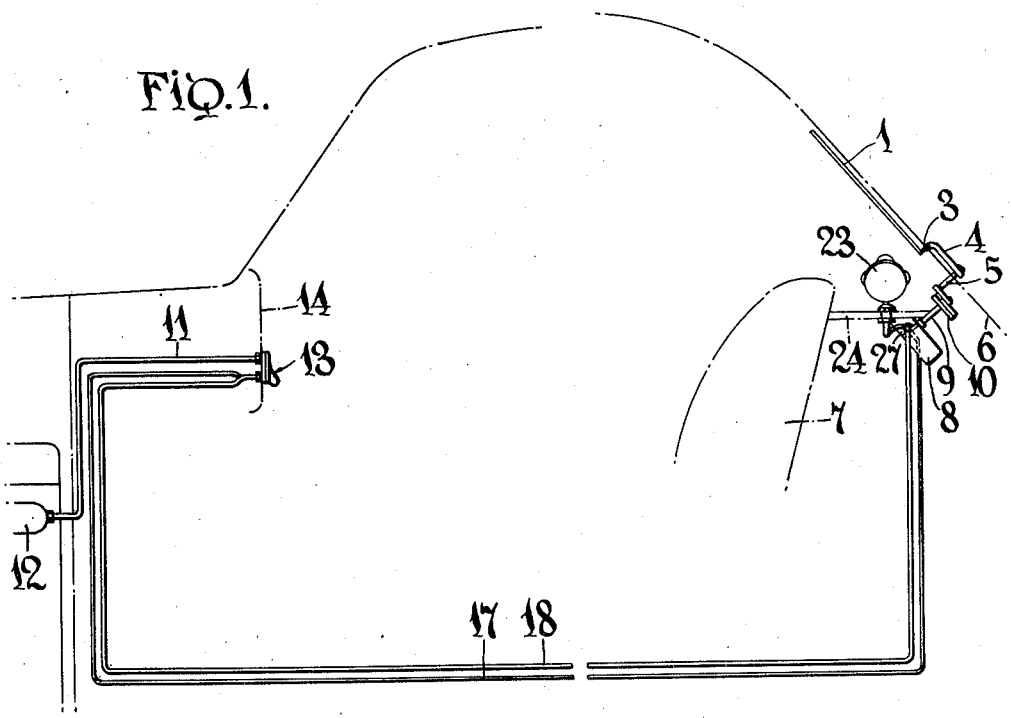
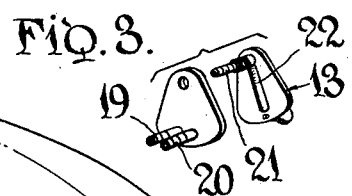
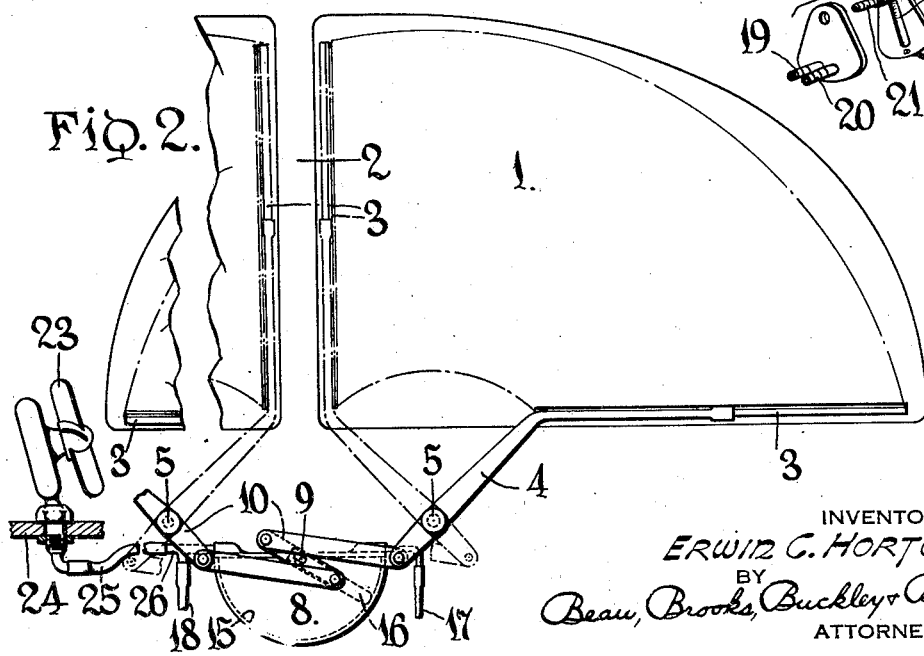
INVENTOR
ERWIN C. HORTON
BY
Beau, Brooks, Buckley & Beau.
ATTORNEYS Patented Feb. 24, 1942

2,274,294

UNITED STATES PATENT OFFICE 2,274,294

WINDOW CLEANING SYSTEM

Erwin C. Horton, Hamburg, N. Y., assignor to Trico Products Corporation, Buffalo, N. Y.

Application April 1, 1939, Serial No. 265,615

6 Claims. (Cl. 15—250)

This invention relates to a window cleaning system for motor vehicles and has particular reference to efficient means for cleaning windows of the vehicle removed from the driver of the same, such as the rear window, through which it is desired to maintain clear vision for safe operation of the vehicle.

In streamlining the modern passenger motor vehicle with a sloping rear body portion the rear window has been displaced at quite an angle from the perpendicular and consequently is disposed to accumulate snow, dust and other falling vision-obscuring matter. Because of its angular placement the inner surface of the rear window readily collects moisture of condensation which likewise tends to becloud the vision therethrough. Being quite removed from the operator of the vehicle a clouded rear window becomes an annoyance to him and serves to distract his attention from safely manipulating the vehicle. It is unnecessary, in order to maintain clear vision through the rear window, to have an automatic and continuously operating cleaner such as is used on the windshield, but nevertheless it is desirable to have some means operable at the will of the motorist to clarify the vision through the window, as occasion may require.

The present invention has for its object to provide a window cleaning system in which the rear window may be acted upon at the will of the motorist to remove vision obscuring matter therefrom for the better observance of the traffic to the rear of the vehicle.

The invention further resides in a motor vehicle incorporating the rear window cleaning system as a built-in part thereof for greater efficiency in operation and for increased comfort to the passengers.

In the drawing wherein one embodiment of the invention is illustrated

Fig. 1 is a diagrammatic illustration of the motor vehicle incorporating the system for cleaning the rear window;

Fig. 2 is a rear elevation of the window in fragment depicting diagrammatically the exterior wiper installation combined with the interior defrosting means; and Fig. 3 is a perspective view of the parts of the control valve.

Referring more particularly to the drawing, the numeral 1 designates the rear window of the motor vehicle which may be of the divided type having the two glass panels separated by a central mullion strip 2. Each light or section of the window is provided with a wiper 3 carried by an arm 4 which in turn is connected to the actuating shaft 5 that preferably has journal support beneath the window in the framing structure 6 of the vehicle body. Suitably concealed within the vehicle body and to the rear of the back seat 7 is a motor 8 having its shaft 9 connected by linkage 10 to a respective one of the two shafts 5. Where the rear window is undivided and unitary throughout, a single wiper may be used in which event the wiper arm 4 may be attached directly to the motor shaft 9 which will be extended to a convenient position for such purpose.

The motor 8 is connected by a power line 11 to the source of power 12 and its control 13 is accessible to the motorist by disposing the same on the instrument panel 14. According to the present disclosure the motor is of the fluid pressure type, having a chamber 15 enclosing a piston 16 which in turn is connected to the motor shaft 9. In order to make the motor power actuated in both directions, the chambers at the opposite sides of the piston are connected directly to the control member 13 by branch conduits 17 and 18 which open through ports 19 and 20 of the control member or valve and are adapted to be selectively connected to a third port 21 by a passage 22. The port 21 is connected by the power line 11 to the intake manifold as a source of suction. The motor 8, being of the double acting type, is without automatic valve mechanism, the operation being such that one stroke of the wiper will occur when the port 21 is connected to port 19 and a reverse stroke when valve 13 is moved to connect port 20. At the end of each stroke the wiper is fluid locked or held in such terminal position until the valve is manually moved to connect the other one of the two motor ports to the power supply port 21, whereupon the wiper will be driven in the opposite direction by reason of the pressure differential set up in the motor, the unconnected port venting its side of the motor to the atmosphere. Since it is unnecessary to continuously operate the wiper in order to maintain clear vision through the rear window the motorist will manipulate the control valve for each wiper stroke.

To remove the moisture of condensation from the inner surface of the window, suitable cleaning or defrosting means 23 may be positioned on the window sill or shelf 24 at the rear of the back seat. The defroster is herein illustrated as a suction operated fan by which a current of air is circulated across the interior window surface to remove the moisture therefrom. A conduit 25 connects the fan 23 to a T-shaped coupling 26 inserted in one of the branch conduits, preferably branch 18, this branch being selected for the reason that when the fan is turned off the companion wiper will assume a position against or adjacent the lower edge of the window, as illustrated by the full lines in Fig. 2. When the fan is turned on, as by coupling the port 20 to the port 21, the wiper 3 will wipe across the exterior window surface to assume the vertical or upright position indicated by the broken line showing in Fig. 2. Where the fan requires a larger air stream than that required for the wiper motor 8, the branch conduit 18 and its connecting conduit 25 may be of larger cross section relative to the branch conduit 17, as shown, to insure efficient operation of both the wiper motor and the fan motor.

In operation, to clean the rear window the motorist will simply move his valve 13 to connect port 20 to the supply port 21, whereupon the fan will begin operating and simultaneously the wiper will move a single stroke to wipe the window clear of snow or other obscuring matter. If it is desired to cause the wiper to take more than one stroke the valve 13 will be manually shifted back and forth between the ports 19 and 20 accordingly. Primarily, the system will operate to remove moisture from the inner surface of the window while the wiper remains in its upright position after making its initial sweep to insure the exterior surface being cleaned. To stop the fan operation the valve will accordingly be shifted to port 19 so as to vent the conduits 18 and 25 to the atmosphere and connect branch 17 to the source of suction. This will move the wiper to its lowered position on the window.

From the foregoing it will be observed that the wiper motor will return the wiper to its normal resting position whenever the fan is turned off and that such return movement is preferably imparted to the wiper by the fluid pressure which serves to initially operate the wiper when the fan is turned on. While the wiper motor might be of the self-return type embodying some suitable means for restoring the piston to its normal position after the fan has been turned off, it is desirable to have such return movement imparted by the fluid pressure differential so that each stroke of the wiper will be power actuated.

It is, therefore, obvious that both the inner and outer surfaces of the window will be acted upon simultaneously by the interior and exterior window cleaning means which are placed under the control of the motorist for operation at will. The motor 8 may be mounted to the underside of the sill 24 by the bracket 27 and rendered accessible by a removable portion thereof.

While the foregoing disclosure has been made in great detail it is merely illustrative of the inventive teaching involved which may be applied to other physical embodiments without departing from the scope and spirit of the claimed invention.

I claim:

1. A motor vehicle having a source of fluid pressure, a pressure actuated fan for defrosting the inner side of a vehicle window, a pressure operated wiper operable for a predetermined period to clean the opposite side of the window and then coming to rest, means operable in one position to connect and in another position to disconnect the fan to the source of pressure and when in said one position serving to cause the pressure to operate the fan indefinitely, and means acting to connect the wiper for such predetermined period of operation by and during the operation of said first means to connect the fan to the source.

2. A motor vehicle having a source of suction, suction actuated means for cleaning one side of a vehicle window, suction operated means for removing moisture from the opposite side of the window, one of said means embodying a double acting motor for imparting a single stroke to a wiper element first in one direction upon the application of suction to one side of the motor and then a stroke in the opposite direction upon the application of suction to the opposite side of the motor, a suction line leading from both of said means to the source, a second suction line connecting the latter to the motor, the two suction lines connecting to the opposite sides of the motor, and means for selectively opening and closing the two suction lines.

3. A window cleaner comprising a wiping element normally parked adjacent one edge of a window, a fluid motor connected to the wiping element for operating the same back and forth on one face of the glass, said motor comprising a chamber with a piston therein, with means for connecting the opposite sides of the chamber alternately to the operating pressure for reversing the movement of the wiper, a fan arranged to remove moisture from the opposite surface of the glass, said fan having a fluid motor for operating the same, and a fluid connection between the fan and the chamber at one side only of the piston whereby the fan will function when the operating pressure is connected to such specified side of the chamber.

4. A window cleaner comprising means for acting on one surface of a window to remove moisture from the same, selectively operable means movable to one position for rendering the removing means operable and to another position for arresting said removing means, other means for wiping the opposite surface of the window for a definite period and then automatically coming to rest, and means connected to said selective means and effecting operation of said other means for such definite period upon movement of said selective means to operate the removing means.

5. A window cleaner comprising means for acting on one surface of the window to remove vision obscuring matter from the same, and other means to clean the opposite surface operable at intervals with intervening periods of rest, means selectively controlling the operation of said other means, and means under the control of said selective means to effect continuous operation of said removing means only upon a predetermined selective operation of said selective means and to arrest said removing means upon another operation of the selective means.

6. Window cleaning apparatus for motor vehicles comprising a wiper element normally parked adjacent one edge of a vehicle window, a fluid motor having a fluid actuated stroke for moving the wiper element on one surface of the window away from its normally parked position and then coming to rest, a valve operable to connect the motor to a source of fluid pressure for effecting such stroke, means acting to remove vision obscuring matter from the opposite surface of the window, and means effective by the valve during such motor connecting movement for energizing said removing means.

ERWIN C. HORTON.